US010237220B2

(12) United States Patent
Adkins et al.

(10) Patent No.: US 10,237,220 B2
(45) Date of Patent: Mar. 19, 2019

(54) TECHNIQUES TO PROMOTE FILTERED MESSAGES BASED ON HISTORICAL REPLY RATE

(71) Applicant: Facebook, Inc., Menlo Park, CA (US)

(72) Inventors: Michael David Adkins, Sunnyvale, CA (US); Seth Garrett Steinberg Rosenberg, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 436 days.

(21) Appl. No.: 14/808,934

(22) Filed: Jul. 24, 2015

(65) Prior Publication Data
US 2017/0026328 A1  Jan. 26, 2017

(51) Int. Cl.
*H04L 12/58* (2006.01)

(52) U.S. Cl.
CPC .............. *H04L 51/12* (2013.01); *H04L 51/22* (2013.01); *H04L 51/28* (2013.01); *H04L 51/32* (2013.01)

(58) Field of Classification Search
CPC ......... H04L 51/12; H04L 51/32; H04L 51/22; H04L 51/28
See application file for complete search history.

(56) References Cited

U.S. PATENT DOCUMENTS

| | | | | |
|---|---|---|---|---|
| 2007/0203997 A1* | 8/2007 | Ingerman | ............. | G06Q 10/107 709/206 |
| 2011/0119258 A1* | 5/2011 | Forutanpour | ........ | G06Q 10/107 707/723 |
| 2011/0196939 A1* | 8/2011 | Appelman | .............. | H04L 51/12 709/206 |
| 2013/0124648 A1* | 5/2013 | Kallayil | ............... | G06Q 10/107 709/206 |
| 2013/0311587 A1* | 11/2013 | Malik | ..................... | G06Q 10/00 709/206 |
| 2013/0325991 A1* | 12/2013 | Chambers | ............... | H04L 51/12 709/206 |
| 2014/0325007 A1* | 10/2014 | Dulitz | ..................... | H04L 51/12 709/206 |
| 2015/0248389 A1* | 9/2015 | Kahn | ..................... | G06F 17/241 715/230 |

* cited by examiner

*Primary Examiner* — Chris Parry
*Assistant Examiner* — Caroline H Jahnige

(57) ABSTRACT

Techniques to promote filtered messages based on historical reply rate are described. In one embodiment, an apparatus may comprise a messaging interface component operative to receive an incoming message; and transmit the incoming message to a configured delivery mailbox on a client device; and a destination mailbox configuration component operative to determine one or more connection categories between the sender account and the recipient account; determine a predicted reply rate for the incoming message based on the one or more connection categories, a recipient reply history for the recipient account, and a sender reply history for the sender account; configure the delivery mailbox for the incoming message based on the predicted reply rate; identify a most-prominent connection category of the one or more connection categories; and configure the incoming message with a banner message indicating the most-prominent connection category. Other embodiments are described and claimed.

20 Claims, 12 Drawing Sheets

TECHNIQUES TO PROMOTE FILTERED MESSAGES BASED ON HISTORICAL REPLY RATE

RELATED APPLICATIONS

This application is related to U.S. patent application Ser. No. 14/328,646, titled "Systems and Methods for Directing Messages Based on Social Data," filed on Jul. 10, 2014, which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to promote filtered messages based on historical reply rate. Some embodiments are particularly directed to techniques to promote filtered messages based on historical reply rate for the management of unprompted messaging contacts from strangers. In one embodiment, for example, an apparatus may comprise a messaging interface component operative to receive an incoming message addressed to a recipient account from a sender account at a messaging system; and transmit the incoming message to a configured delivery mailbox on a client device associated with the recipient account; and a destination mailbox configuration component operative to determine one or more connection categories between the sender account and the recipient account; determine a predicted reply rate for the incoming message based on the one or more connection categories, a recipient reply history for the recipient account, and a sender reply history for the sender account; configure the delivery mailbox for the incoming message based on the predicted reply rate; identify a most-prominent connection category of the one or more connection categories; and configure the incoming message with a banner message indicating the most-prominent connection category. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
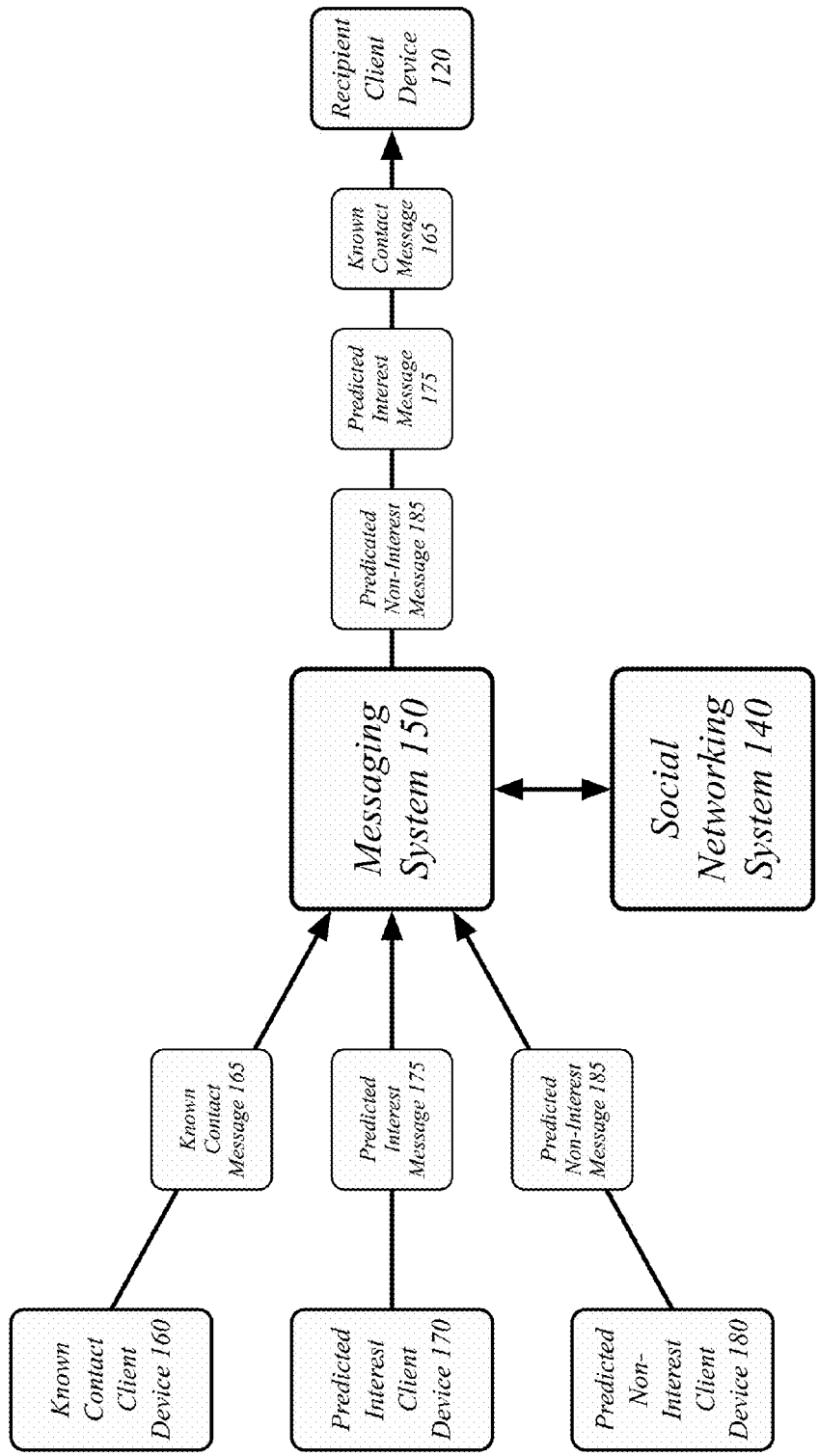
FIG. 1 illustrates an embodiment of a delivery mailbox configuration system.

A messaging system may support a large number of and a large variety of users. These users may be empowered with various techniques for discovering each other. These techniques may be particularly varied where the messaging system operates as part of a more expansive system, such as a social networking system, that may provide many features and organizational tools through which users can discover each other. Users of a messaging system may therefore receive messages from users with which they have an existing relationship—having previously exchanged messages with a messaging user, having the messaging user on a contact list, having a registered friend relationship with the messaging user in a social network, etc.—and from users with which they don't have an existing relationship.

Where a user has an existing relationship with a messaging user, the user may be happy to have messages from the messaging user delivered to the primary mailbox. Further, some messages from people with which they don't have an existing relationship may be acceptable to receive in the primary mailbox if these messages are of sufficient interest to the receiving user. However, a user may become frustrated if unwanted messages are routed to their primary mailbox, particularly if these messages are from strangers or others with which they don't have an existing relationship.

As such, users may benefit from having an additional, separate mailbox into which at least some portion of messages from unknown users are filtered. The messaging system may therefore attempt to estimate the interest the receiving user has in a message received from a messaging user. As messaging interactions are frequently conversations—bidirectional or multidirectional rather than one-way interactions—a prediction as to whether a user will respond to a message from an unknown contact may serve as a useful proxy for whether a user has an interest in the message from the unknown contact. Because replying is an external, objective act—rather than an internal, subjective experience—it may be more practical to estimate the possibility of a user replying to a message than it is estimate the possibility of a user having an interest in the message; replying may serve as an external measure of the user's interest.

Messages that the messaged user is predicted to be likely to respond to may therefore be sorted to the primary mailbox, while messages that the user is not predicted to be likely to respond to are filtered to the separate mailbox. This separate mailbox may be less prominent in the user interface for the messaging system presented to the messaged user and may be associated with lower-priority notification of new messages to the messaged user. For example, when using a mobile device (e.g., smartphone), the messaged user may receive a push notification for messages assigned to the primary mailbox, while the messaging system may refrain from sending a push notification for messages assigned to the separate, lower-priority mailbox so as to avoid interrupting a user with a message that they are predicted to not be interested in.

A user's probability of replying to a message may be inferred from their previous behavior with regards to similar previous messages. For instance, a broad estimation of a user's reply probability may be made as being equal to the user's historic reply rate for messages from unknown contacts. However, a better prediction may be made by narrowing the portion of the messages from unknown contacts that are included in the historic reply rate to estimate the reply probability for an incoming message. For a messaging system that empowers users with a variety of techniques to discover each other, one useful technique for narrowing a user's history is to use the one or more channels with which the messaging user may have discovered the messaged user. For example, if the users are members of the same group, are registered as having attended or going to attend a particular event, or have a friend in common, then that may be how the messaging user discovered the messaged user. The user's reply probability may therefore be estimated based on the user's historic reply rate for messages from that channel—shared events, shared groups, shared friends, etc. This estimate may be a higher-quality estimate than if a channel were not incorporated into the analysis.

The messaging user's history may also be relevant to the estimation. Just as a messaged user may have a reply history for replying to messages from unknown contacts, a messaging user may have a reply history for receiving replies to messages sent to unknown contacts. Where a messaged user's history may reflect the messaged user's interest in receiving messages from unknown contacts that have discovered them via various channels, a messaging user's history may reflect the messaging user's success in starting conversations with users with which they don't have an existing messaging relationship. A user that discriminates in selecting appropriate users for messaging and/or directs the contents of their message to the likely interests of the messaged user may deserve to be assigned to a primary mailbox. For example, a user that messages another user from a shared group with a message that is on-topic for the group—an offer to trade board games in a board game swapping group, for example—may have a high reply rate and therefore earn assignment of their messages to users in a shared group to the primary mailboxes of the messaged users.

The messaged user's evaluation of a received request-to-chat message may be aided by being informed of their connection to the messaging user. The messaging system's evaluation of the messaged user's connection to the messaging user may be leveraged to determine what connection between the messaging user and the messaged user to display to the messaged user in association with a received request-to-chat message. In particular, the connection between the messaged user and the messaging user that is predicted to most likely generate a reply from the messaged user may be used to characterize the messaged user. This connection may be displayed in a banner message displayed with the request-to-chat message in association with other information relating to the messaging user so as to inform the messaged user of who is attempting to message them.

As such, a messaging system may analyze the context of a message between users without a previous messaging history or other previous relationship. The messaging system may incorporate the messaging history, particularly the reply rates for each user, and generate a predicted probability of reply to such a message. The messaging system may then assign the message to a primary mailbox or a lower-priority mailbox based on this predicted probability. The messaging system may accompany the message with an information display communicating a most-prominent connection between the users. As a result, these embodiments can improve the utility of a messaging system for its users, empowering users to reach out to users with which they don't yet have a relationship while limiting the inconvenience of receiving messages in which a user is not interested.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a delivery mailbox configuration system 100. In one embodiment, the delivery mailbox configuration system 100 may comprise a computer-implemented system having software applications comprising one or more components. Although the delivery mailbox configuration system 100 shown in FIG. 1 has a limited number of elements in a certain topology, it may be appreciated that the delivery mailbox configuration system 100 may include more or less elements in alternate topologies as desired for a given implementation.

A messaging system 150 may be generally arranged to receive, store, and deliver messages. The messaging system 150 may store messages while messaging clients, such as may execute on recipient client device 120, known contact client device 160, predicted interest client device 170, and predicted non-interest client device 180, are offline and deliver the messages once the messaging clients are available.

Client devices 120, 160, 170, and 180 may execute messaging clients for the messaging system 150, wherein each of the client devices 120, 160, 170, and 180 and their respective messaging clients are associated with a particular user of the messaging system 150. In some embodiments, the client devices 120, 160, 170, and 180 may be cellular devices such as smartphones and may be identified to the messaging system 150 based on a phone number associated with each of the client devices 120, 160, 170, and 180. In some embodiments, the client devices 120, 160, 170, and 180 may be identified to the messaging system 150 based on a user account registered with the messaging system 150—and potentially a social networking system 140 that comprises or is associated with the messaging system 150—and logged into from the messaging client executing on the client devices 120, 160, 170, and 180. In general, each messaging client may be addressed through various techniques for the reception of messages. While in some embodiments the client devices 120, 160, 170, and 180 may comprise cellular devices, in other embodiments one or more of the client devices 120, 160, 170, and 180 may include personal computers, tablet devices, any other form of computing device without limitation. Personal computers and other devices may access a messaging system 150 using web browser accessing a web server, for instance.

A known contact client device 160 may correspond to a client device associated with a sender account with a preexisting relationship with the recipient account to which a known contact message 165 is directed. The preexisting relationship may comprise the recipient account and sender account having previously interacted with each other, and may specifically comprise the recipient account having messaged the sender account and thereby indicated an interest in communicating with the sender account. The preexisting relationship may comprise the recipient account and sender account being registered as friends or another social relationship with a social networking system 140 associated with the messaging system 150. The preexisting relationship may comprise the recipient account having the sender account on a contact list registered with the messaging system 150. In general, a preexisting relationship may correspond to any action performed via the recipient account that engages with the sender account, including messaging, registering a social relationship, or adding as a contact.

The known contact client device 160 may transmit a message to the recipient client device 120 as a sender account messaging a recipient account, with the messaging comprising a known contact message 165 due to the preexisting relationship with the sender account for the known contact client 160 and the recipient account for the recipient client device 120. The messaging system 150 may transmit the known contact message 165 to the recipient client device 120 for viewing by the user associated with the recipient account. The known contact message 165 may be configured for delivery to a primary mailbox for the recipient account—and thereby a primary mailbox on the recipient client device 120—due to the preexisting relationship between the sender account for the known contact client device 160 and the recipient account for the recipient device 120. In some embodiments, a message notification may be transmitted to the recipient client device 120 to alert the user of the recipient client device 120 that they have a message available due to the assignment of the known contact message 165 to the primary mailbox for the recipient account.

A predicted interest client device 170 may correspond to a client device associated with a sender account without a preexisting relationship with the recipient account, but where a message sent to the recipient account for the recipient client device 120 is predicted to be of interest to the user of the recipient client device 120 and is therefore a predicted interest message 175. This predicted interest may be based on an analysis of the reply history for the recipient account for messages directed to the recipient account and/or based on an analysis of the reply history for the sender account for the predicted interest message 175. The predicted interest may be specifically associated with an inferred association between the sender account for the predicted interest client device 170 and the recipient account for the recipient client device 120.

The messaging system 150 may transmit the predicted interest message 175 to the recipient client device 120 for viewing by the user associated with the recipient account. The predicted interest message 175 may be configured for delivery to a primary mailbox for the recipient account—and thereby a primary mailbox on the recipient client device 120—due to the prediction of the recipient user's interest in the predicted interest message 175. In some embodiments, a message notification may be transmitted to the recipient client device 120 to alert the user of the recipient client device 120 that they have a message available due to the assignment of the predicted interest message 175 to the primary mailbox for the recipient account.

A predicted non-interest client device 180 may correspond to a client device associated with a sender account without a preexisting relationship with the recipient account and where a message sent to the recipient account for the recipient client device 120 is predicted to not be of interest to the user of the recipient client device 120 and is therefore a predicted non-interest message 185. This predicted lack of interest may correspond to a lack of a predicted interest and may be based on an analysis of the reply history for the recipient account for messages directed to the recipient account and/or based on an analysis of the reply history for the sender account for the predicted non-interest message 185. The lack of predicted interest may be specifically associated with an inferred association between the sender account for the predicted non-interest client device 180 and the recipient account for the recipient client device 120.

The messaging system 150 may transmit the predicted non-interest message 185 to the recipient client device 120 for viewing by the user associated with the recipient account. The predicted non-interest message 185 may be configured for delivery to a request-to-chat mailbox for the recipient account—and thereby a request-to-chat mailbox on the recipient client device 120—due to the prediction of the recipient user's non-interest in the predicted non-interest message 185. In some embodiments, the messaging system 150 may refrain from transmitting a message notification to the recipient client device 120 due to the assignment of the predicted non-interest message 185 to the request-to-chat mailbox for the recipient account, in contrast with sending a notification where a pre-existing relationship exists or a the recipient user's interest is predicted.

A notification may comprise a push notification transmitted to the recipient client device 120 in excess of any requests by the recipient client device 120 to retrieve information, without waiting for the recipient client device 120 request the delivery of any available and queued messages. In contrast, the actual delivery of messages—such as the known contact message 165, predicted interest message 175, and predicted non-interest message 185—may be queued by the messaging system 150 until the recipient client device 120 communicates a request to the messaging system 150 for any undelivered messages addressed to the recipient account associated with the recipient client device 120. A notification may prompt a display on a user interface for the recipient client device 120, such as on the lock screen of the recipient client device 120 and/or in association with an icon for a messaging client application associated with the messaging system 150.

In general, the use of a notification may correspond to a higher-prominence and more-interruptive technique for informing a user of the recipient client device 120 that a message is available, as contrasted with waiting until the user actives a messaging client application and sees within the messaging client application that a request-to-chat message is available. Where a user receives a message in which they are interested, such as known contact message 165 or predicted interest message 175, they may welcome an immediate notification and interruption as it indicates that they may engage in a messaging interaction in which they are interested. However, where a message is likely not of interest to the user, they may prefer not to be interrupted or immediately notified and instead to wait see that a request-to-chat message is available until they choose to operate a messaging client application. As such, the selective sending of notifications based on whether a message is predicted to be of interest or not predicted to be of interest may serve to reserve notifications for those cases in which a user welcomes an interruption and benefits form immediate notification that a message is available.

Delivery mailbox configuration system 100 may include an authorization server (or other suitable component(s)) that allows users to opt in to or opt out of having their actions logged by delivery mailbox configuration system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of delivery mailbox configuration system 100 and other elements of a messaging system through blocking, data hashing, anonymization, or other suitable techniques as appropriate. In some embodiments, a user may be presented with information regarding may be collected and how that information may be used, such as informing the user that collected information may be anonymized prior to analysis.

Figure 2:
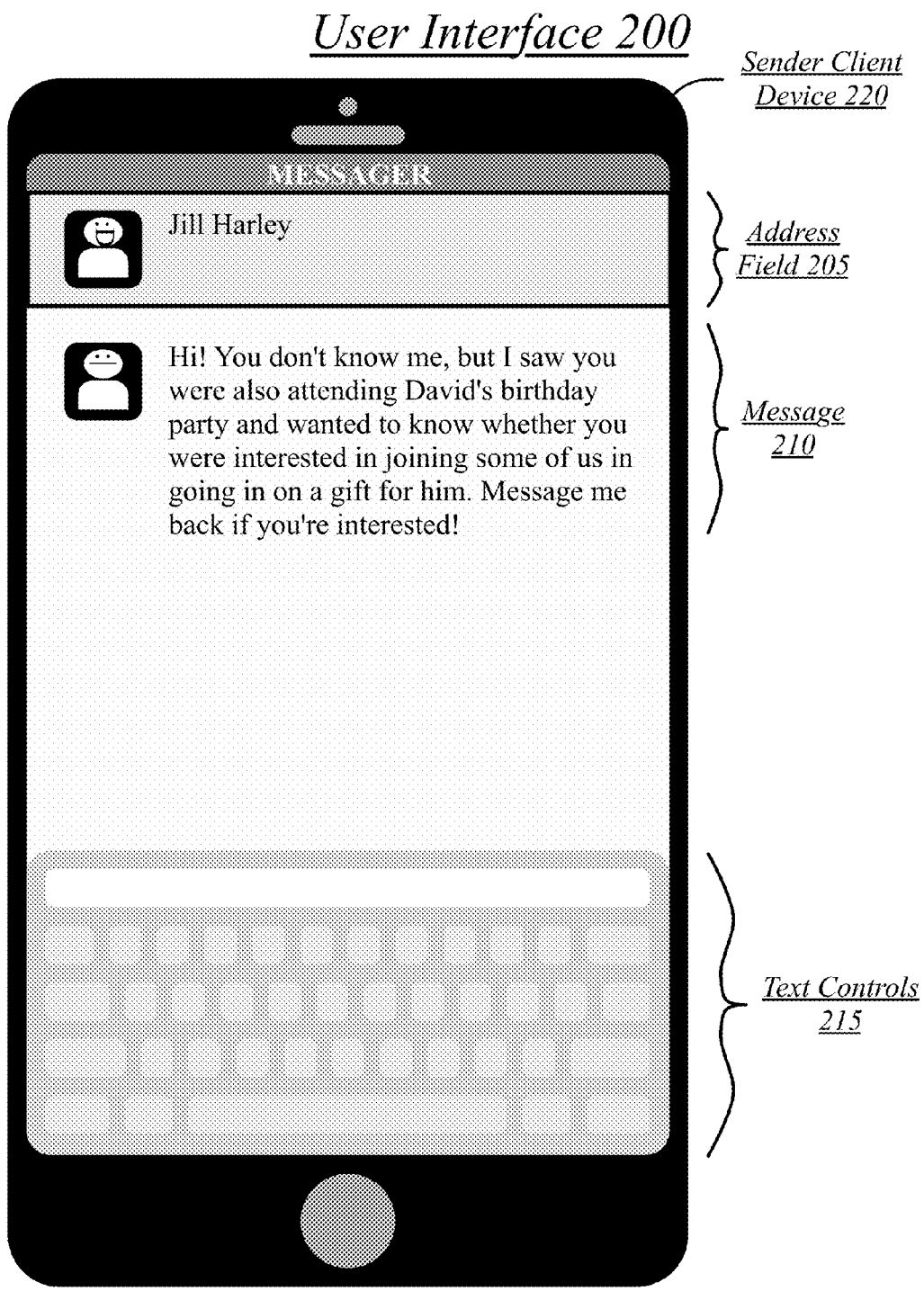
FIG. 2 illustrates an embodiment of a user interface displaying a message composition interface.

FIG. 2 illustrates an embodiment of a user interface 200 displaying a message composition interface on a sender client device 220.

The sender client device 220 may correspond to any client device of the messaging system 150 being used to compose a message, such as known contact client device 160, predicted interest client device 170, and predicted non-interest client device 180. A messaging composition interface may comprise a feature of a messaging client empowering a user of the messaging client to compose and submit messages for delivery by the messaging system 150.

Composing a message may include specifying one or more user accounts to whom to address a messages, such as by entering the names associated with the user accounts (i.e., the names of the messaged users) in an address field 205. The messaging client may be operative to perform auto-complete on names entered in an address field 205, such as by retrieving matching names from a messaging user's contact list, friends list, or other repository contact information associated with a user. In some cases, an addressed user account may be added to the address field 205 in response to a user being selected elsewhere in a user interface for a messaging system 150, social networking system 140, and/or other network system or service. For instance, one user may select another user during their use of a social networking system 140: the user may select the other user from a group member list in a group user interface; the user may select the user from an invited, attending, or attended member list in an event user interface; or the user may, in general, select the user from a user list or user display in a user interface for a social networking system 140 or other network system or service. Selecting the user may empower the messaging user to add the selected user to the address field 205.

Composing a message may include specifying content for the message. Content may include a user-generated text segment, such as may be entered using text controls 215. It will be appreciated that while the illustrated text controls 215 of FIG. 2 comprise touchscreen software text controls, that in other embodiments other input techniques may be used for user-generated text, such as hardware text controls, handwriting recognition, voice input, or any other technique for text input. The user of the sender client device 220 may enter a message 210, with the illustrated message comprising an invitation to enter into a conversation. In some cases, a message 210 may additionally or alternatively comprise non-text elements, such as media items. Media items may include, without limitation, images, animated images, videos, audio items, or any other type of media.

The user interface 200 may correspond to an embodiment in which message 210 has just been sent. In this case, the address field 205 may communicate the other user in which the user of the sender client device 220 is engaging in conversation after the selection of that other user during the composition of the message 210. The message 210 may be displayed as a display of the messaging history between the two users—in this case, that messaging history between the two users being comprised solely of the message 210. During the composition of message 210 additional controls may be displayed, such as for the sending of the message 210, the inclusion of media, and other messaging composition controls.

The message 210 may comprise an initial message sent between the two users. The messaged user may correspond to the user of the recipient client device 120 as described with reference to FIG. 1. The two users may not have previously messaged before and may not have an established relationship within the messaging system 150 and/or within the social networking system 140. An established relationship may correspond to a direct relationship between the users as registered in their user account, and may therefore include friendship or a direct messaging history, but not include attendance or invitation to the same event, membership in the same group, or other group connection without a corresponding direct connection. The message 210 may correspond to one of the predict interest message 175 or predicted non-interest message 185 depending on the analysis of the messaging system 150. It will be appreciated that a user interface such as the messaging composition interface of FIG. 2 may also be used in the composition of messages such as known contact message 165 that are between users with an established relationship.

Figure 3A:
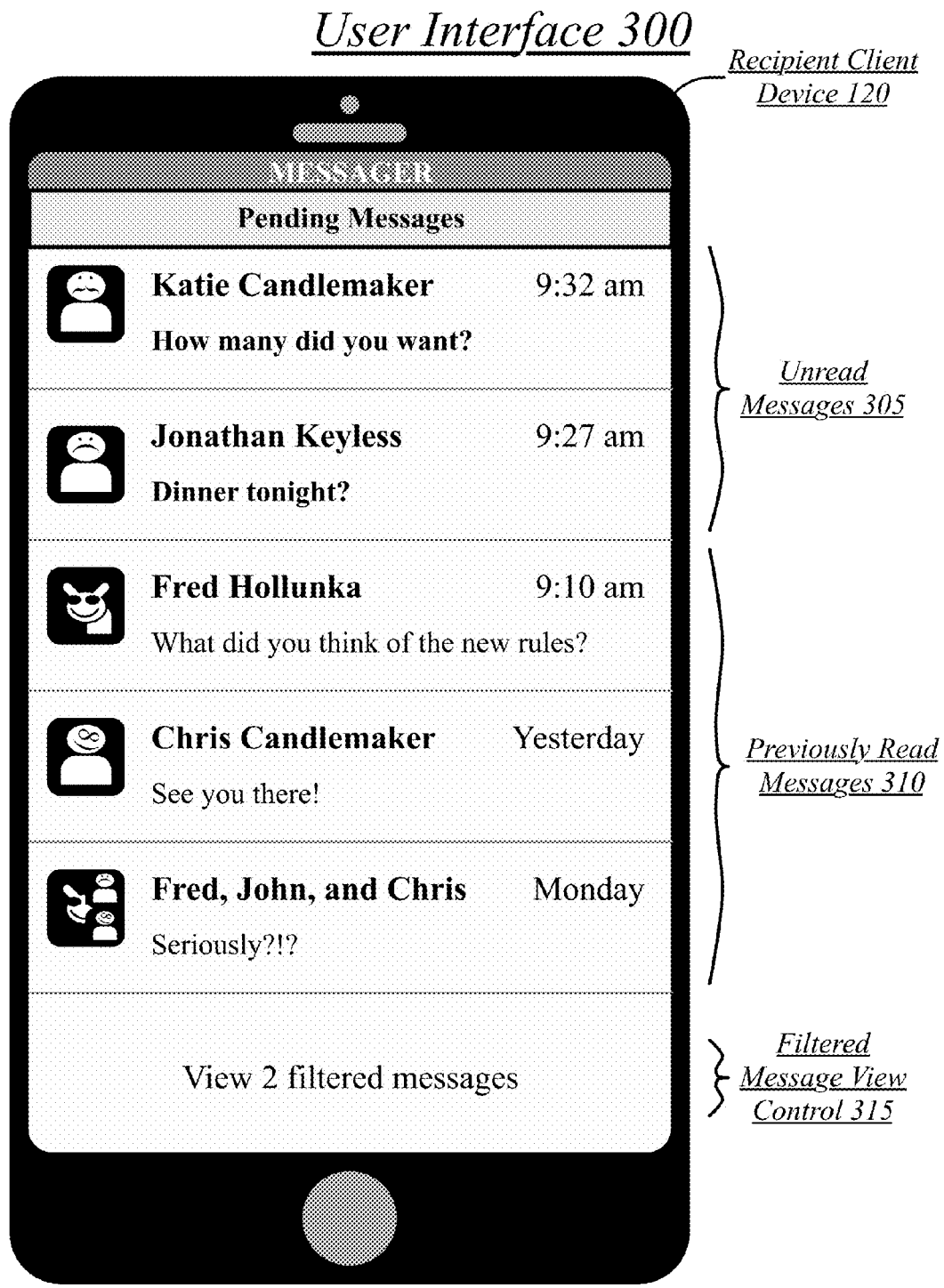
FIG. 3A illustrates an embodiment of a user interface displaying a messaging mailbox interface.

FIG. 3A illustrates an embodiment of a user interface 300 displaying a messaging mailbox interface on the recipient client device 120.

In one embodiment, this messaging mailbox interface may correspond to a view of and controls for the primary mailbox for the user of the recipient client device 120. This primary mailbox may be assigned messages that are exchanged with (received from and/or sent to) users with which the user of the recipient client device 120 has an existing relationship, such as known contact message 165, and those that were predicted to be of interest to the user of the recipient client device 120, such as predicted interest message 175. The primarily mailbox may also organize messages reassigned to it, such as if a message that was not predicted to be of interest were viewed by the user of the recipient client device 120 and replied to or otherwise responded to in a manner indicating interest and therefore moved to the primary mailbox. These embodiments may divide messages into at least two mailboxes: a high-priority mailbox (assigned known contact messages and unknown-contact predicted-interest messages) and a low-priority mailbox (assigned unknown-contact predicted-disinterest messages).

In another embodiment, this messaging mailbox may correspond to a view of and controls for a highly-rated request-to-chat mailbox. A different, primary mailbox may be assigned messages exchanged with users with which the user of the recipient client device 120 has an existing relationship. The highly-rated request-to-chat mailbox may be assigned messages exchanged with users with which the user of the recipient client device 120 does not have an existing relationship, but that were predicted to be of interest to the user of the recipient client device 120. A different, low-rated request-to-chat mailbox may be assigned messages exchanged with users with which the user of the recipient client device 120 does not have an existing relationship and that were predicted to not be of interest to the user of the recipient client device 120. The primary mailbox may still be reassigned messages that were from users with which the user of the recipient client device 120 does not have an existing relationship but that were viewed by the user of the recipient client device 120 and replied to or otherwise responded to in a manner indicating interest. These embodiments may divide messages into at least three mailboxes: a high-priority mailbox (assigned known contact messages), a medium-priority mailbox (assigned unknown-contact predicted-interest messages), and a low-priority mailbox (assigned unknown-contact predicted-disinterest messages).

Some portion of displayed messages may comprise unread messages 305, which have not yet been read by the user of the recipient client device 120. Some portion of the messages may comprise previously read messages 310, which have previously been read by the user of the recipient client device 120. A record of whether a message has been read or has not been read may be maintained consistently for a user across different client devices by the messaging system 150, such that reading a message on any device marks the message as read on every device.

The messaging mailbox interface may empower the selection of a filtered message view control 315. The filtered message view control 315 may be associated with a display of a number of messages that have been filtered out of the mailbox and have not yet been read. The selection of the filtered message view control 315 may instantiate a request-to-chat mailbox interface displaying messages that have been filtered out of the mailbox into the request-to-chat mailbox. The filtered message view control 315 may generally empower the viewing of lower-priority messages than those displayed in a presently-displayed mailbox. Where the displayed mailbox is a high-priority mailbox displaying only assigned known contact messages, the filtered message view control 315 may instantiate a medium-priority mailbox assigned unknown-contact predicted-interest messages. Where the displayed mailbox is a medium-priority mailbox displaying unknown-contact predicted-interest messages, the filtered message view control 315 may instantiate a low-priority mailbox assigned unknown-contact predicted-disinterest messages. Where the displayed mailbox is a high-priority mailbox assigned both known contact messages and unknown-contact predicted-interest messages, the filtered message view control 315 may instantiate a low-priority mailbox assigned unknown-contact predicted-disinterest messages.

Figure 3B:
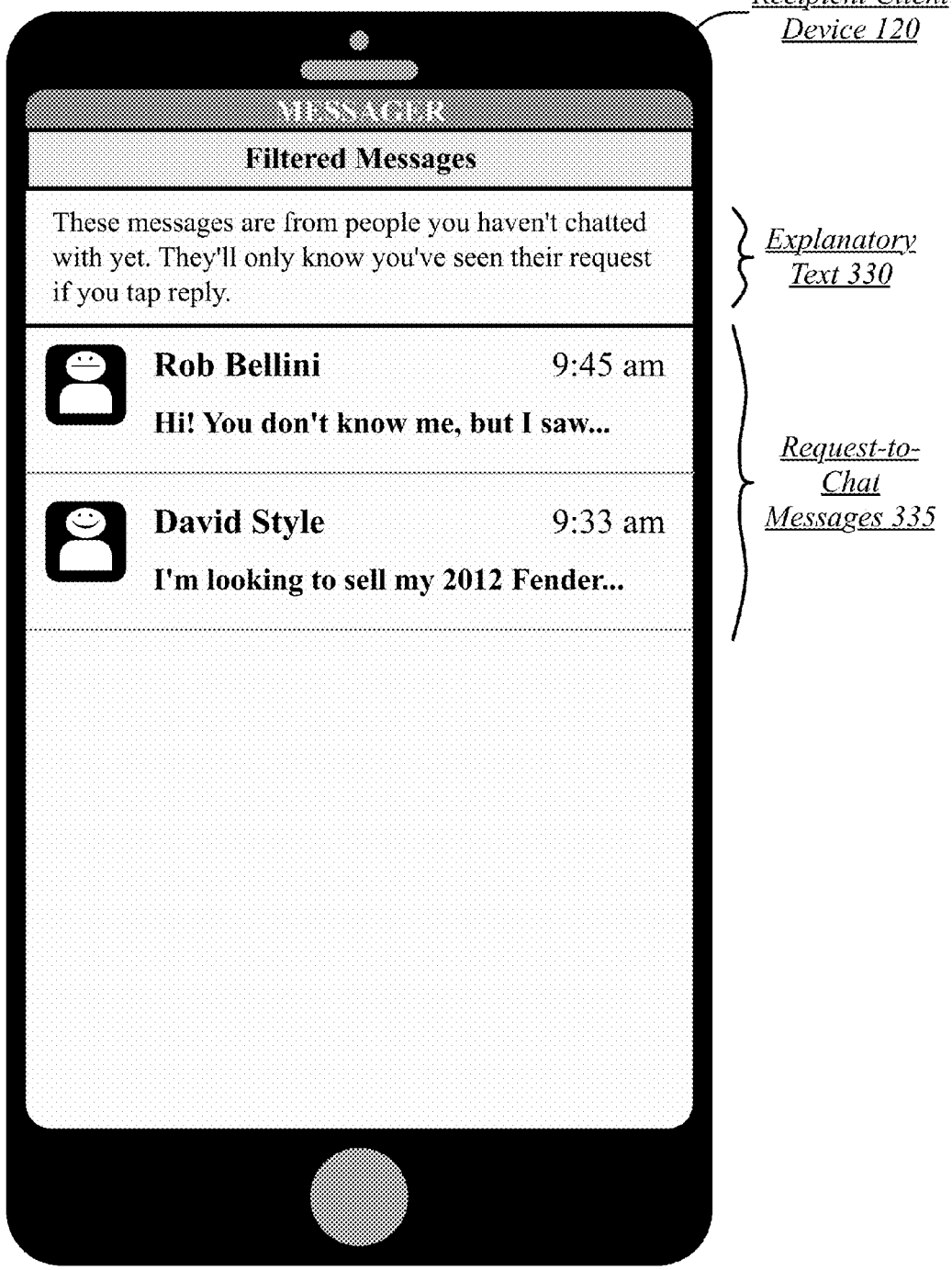
FIG. 3B illustrates an embodiment of a user interface displaying a request-to-chat mailbox interface.

FIG. 3B illustrates an embodiment of a user interface 325 displaying a request-to-chat mailbox interface. The request-to-chat mailbox interface may be reached in the user interface for a messaging client by, for instance, selecting the filtered message view control 315 as described with reference to FIG. 3A.

The request-to-chat mailbox interface may display request-to-chat messages 335, the messages that have been filtered from display in the primary mailbox based on their being from a user without an existing relationship with the messaged user and the predicted probability of reply for the messaged user falling below a defined threshold. The request-to-chat messages 335 may be displayed in reverse chronological order, with the most recent messages of the request-to-chat messages 335 displayed first, as illustrated. In an alternative embodiment, the request-to-chat messages 335 may be displayed according to their predicted probability of reply by the messaged user, with message predicted to be more likely to be replied to being displayed first. In some embodiments, unread request-to-chat messages may be displayed as a group prior to any already-read request-to-chat messages. These techniques may be combined in various embodiments, such as by ordering unread request-to-chat messages according to predicted interest, but ordering already-read request-to-chat messages reverse-chronologically.

Where request-to-chat messages are divided into two request-to-chat mailboxes—a medium-priority mailbox assigned unknown-contact predicted-interest messages and a low-priority mailbox assigned unknown-contact predicted-disinterest messages—different sorting techniques may be used for the two request-to-chat mailboxes. The medium-priority request-to-chat mailbox may be sorted according to the user's predicted interest in the messages, such that messages with the highest predicted interest are placed at the top of the mailbox display, with the messages sorted in order of decreasing predicted interest. In contrast, the low-priority request-to-chat mailbox may be sorted in reverse chronological order, with the most recent messages displayed first. This may serve to present the highest-priority unknown-contact messages most prominently, both by placing them in a distinct mailbox from unknown-contact messages that fall below the predicted-interest threshold and by sorting them according to their predicted interest, while lower-priority unknown-contact messages are displayed in chronological order so that the messaged user may easily view the most recent lower-priority unknown-contact messages.

In some embodiments, the medium-priority mailbox assigned unknown-contact predicted-interest messages and the low-priority mailbox assigned unknown-contact predicted-disinterest messages may be combined in a user interface. The unknown-contact predicted-interest messages may be automatically displayed when the user interface is instantiated as "above the fold" messages that meet the predicted-interest threshold. The unknown-contact predicted-disinterest messages may be initially hidden from view within the user interface—hidden "below the fold"—and only displayed when a low-priority message control is selected by the user so as to not initially bother the user with messages that they are predicted to not have an interest in. In some of these embodiments, the unknown-contact predicted-interest messages may be sorted according to the user's predicted interest in the messages and the unknown-contact predicted-disinterest messages may be sorted in reverse chronological order.

The request-to-chat mailbox interface may include explanatory text 330. Explanatory text 330 may be composed in a display informing the user of the recipient client device 120 of the nature of the request-to-chat mailbox and the rules that control it. For instance, explanatory text 330 may communicate that while the messaging system 150 may generally communicate to a sending user when a recipient user has viewed a message, the messaging system 150 may refrain from communicating to the sending user when a recipient user has viewed a request-to-chat message until and only if the recipient user responds to the request-to-chat message.

The request-to-chat mailbox interface may empower the selection of a particular request-to-chat message out of the plurality of request-to-chat messages 335. The selection of a particular request-to-chat message out of the plurality of request-to-chat messages 335 may instantiate a request-to-chat message interface displaying the message and providing user controls for user interaction with the particular request-to-chat message.

Figure 3C:
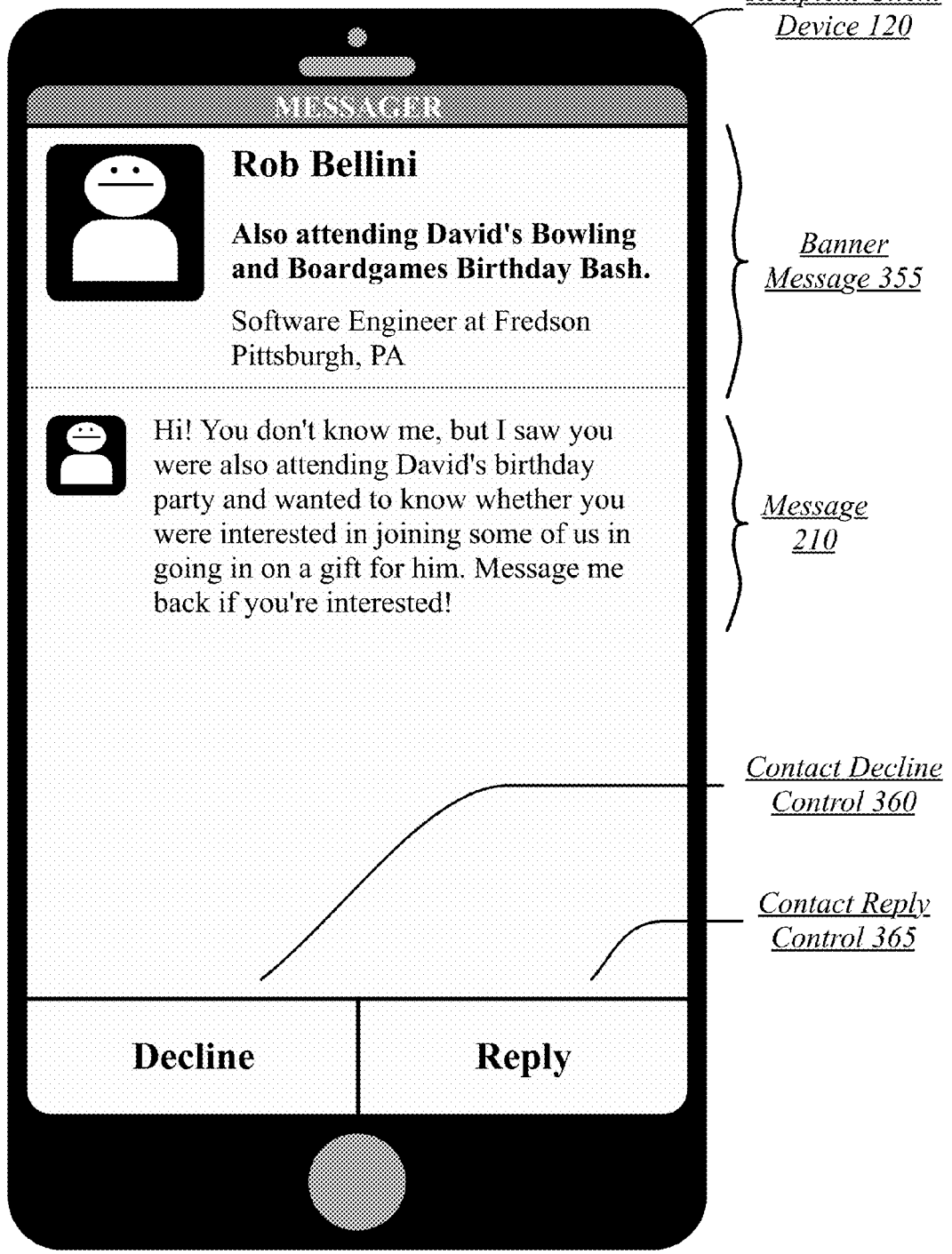
FIG. 3C illustrates an embodiment of a user interface displaying a request-to-chat message interface.

FIG. 3C illustrates an embodiment of a user interface 350 displaying a request-to-chat message interface. The request-to-chat message interface may be reached in the user interface for a messaging client by, for instance, selecting a particular request-to-chat message from a plurality of request-to-chat messages 335 in a request-to-chat mailbox interface as described with reference to FIG. 3B.

The request-to-chat message interface may correspond to the display of a particular request-to-chat message sent to the user of the recipient client device 120. In the illustrated embodiment of FIG. 3C, message 210 composed on the sender client device 220 may have been filtered to the request-to-chat message mailbox by the messaging system 150. The messaging system 150 may have configured message 210 for delivery to the request-to-chat message mailbox 445 based on its analysis of any existing relationship between the sender account and recipient account and its prediction as to the probability of the recipient of the message 210 replying to the message 210.

The request-to-chat message interface may display the message 210. The request-to-chat message interface may display the message 210 in association with a contact reply control 365. The contract reply control 365 may empower the user of the recipient client device 120 to reply to the message 210 using the messaging client and messaging system 150. The contract reply control 365 may instantiate a message composition interface, such as described with reference to FIG. 2. The user of the recipient client device 120 sending a reply to the message 210 may indicate an acceptance by the recipient user of the message 210 which may initiate one or more acceptance actions. A message 210 being accepted may result in the message 210 being moved from the request-to-chat mailbox to the primary mailbox. A message 210 being accepted may result in the messaging system 150 communicating to the sending user that the message 210 was viewed by the recipient user. A message 210 being accepted may establish a messaging relationship between the sender user account and recipient user account such that future messages from sender user account are filtered to the primary mailbox for the recipient user account by the messaging system 150. A reply message sent by the recipient user may be filtered by the messaging system 150 to the primary mailbox for the sender user account based on the sender user account having messaged the recipient user account.

The request-to-chat message interface may display the message 210 in association with a contact decline control 360. The contact decline control 360 may empower a user to explicitly decline to message with the messaging user. In some embodiments, a user explicitly declining a message 210 may remove the declined message 210 from the recipient's request-to-chat mailbox. In contrast, a messaged user may delay the decision to decline or reply by backing out of the request-to-chat message interface, such as may return the user to the request-to-chat mailbox interface. The messaging system 150 may refrain from informing the messaging user as to the messaged user declining the message 210, such as by continuing to refrain from indicating whether the messaged user has viewed the message 210.

The request-to-chat message interface may include a banner message 355. A banner message 355 may comprise various information regarding the sending user, the information selected to inform the recipient user of information relevant to their decision of whether to message with the sending user by responding to the message 210. The banner message 355 may include the name of the sending user. The banner message 355 may include a profile image, avatar image, or other image associated with the sending user with the messaging system 150. The banner message 355 may include a summary of information about the sending user, such as a their occupation or job title, their employer, and a location associated with the user, such as the city in which they live and/or work. The summary of information may be derived from information about the user registered with a social networking system 140 with which the messaging system 150 is associated.

The banner message 355 may include a most-prominent connection category. The most-prominent connection category may communicate the type of connection determined as being most prominent between the sender user account and the recipient user account. In the illustrated embodiment of FIG. 3C, the most-prominent connection category is an event category, represented in this case by both the sender user account and the recipient user account being registered as attending a particular birthday party. As shown in the illustrated embodiment of FIG. 3C, the particular event is listed so as to communicate both that the most-prominent connection category is the event category and the particular event that is responsible for the sender user account and recipient user account sharing that connection category.

Figure 4:
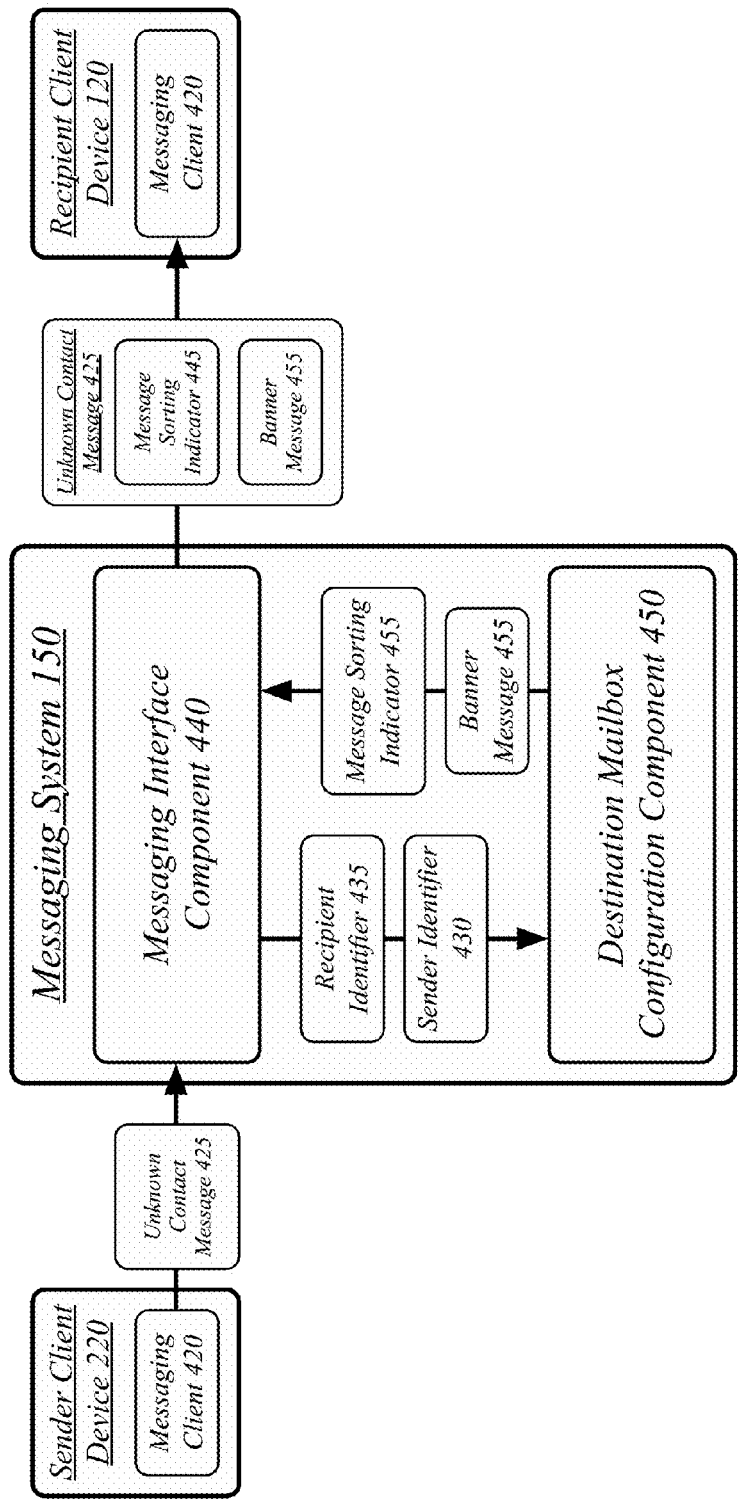
FIG. 4 illustrates an embodiment of a delivery mailbox configuration system processing an unknown contact message.

FIG. 4 illustrates an embodiment of a delivery mailbox configuration system 100 processing an unknown contact message 425.

A sending user with an associated sender user account for a messaging system 150 may operate an instance of a messaging client 420 executing on a sender client device 220. A recipient user with an associated recipient user account for a messaging system 150 may operate an instance of the messaging client 420 executing on a recipient client device 120. In some cases, the recipient user and the sending user may not have a preexisting relationship so far as registered with the messaging system 150 and/or an associated social-networking system 140, thereby making a message 210 sent by the sending user an unknown contact message 425, the unknown contact message 425 comprising an attempt by the sending user to establish a messaging relationship between the sender user account and the recipient user account with the messaging system 150.

The messaging system 150 may comprise one or more components as may be implemented by one or more server devices. The messaging system 150 may comprise a messaging interface component 440 and a destination mailbox configuration component 450. It will be appreciated that additional or alternative components may be used in different embodiments.

The messaging interface component 440 may be generally arranged to receive messages from messaging clients and to transmit messages to messaging clients. The messaging interface component 440 may be operative to queue incoming and outgoing messages and to cache outgoing messages until a messaging client or messaging clients associated with a recipient user account are available to receive messages. The messaging interface component 440 may be operative to receive an incoming unknown contact message 425 addressed to a recipient account from a sender account at a messaging system 150. The messaging interface component 440 may transmit the incoming unknown contact message 425 to a configured delivery mailbox on a recipient client device 120 associated with the recipient account. The configured delivery mailbox may be determined based on whether a preexisting messaging relationship is registered with the messaging system 150 and/or whether a predicted reply rate for the incoming unknown contact message 425 meets a particular threshold. The incoming unknown contact message 425 may be configured with—have a field specified or added—a message sorting indicator 445, the message sorting indicator 445 identifying the delivery mailbox.

The destination mailbox configuration component 450 may be generally arranged to determine which mailbox for a recipient user account to assign messages to. The destination mailbox configuration component 450 may be generally arranged to configure messages for delivery to the determined mailbox, to remotely configure the receiving messaging client(s) in the storage and display of messages, and to configure the network transmission of messages, in particular whether or not network notifications are transmitted for messages.

The destination mailbox configuration component 450 may be operative to determine one or more connection categories between the sender account and the recipient account. A connection category may correspond to a type of connection that may be shared between two users of a messaging system 150 and/or a social-networking system 140. In some embodiments and cases, a particular connection category may cover multiple connections, such as two user accounts both being registered as attending a plurality of events and thereby sharing the calendar event category based on all of the plurality of events. A shared connection category may be used to categorize the frequency with which the recipient user replies to messages from users with which they have a connection in that category and to categorize the frequency with which the sending user is successful in prompting replies from users with which they have a connection in that category. The one or more connection categories may comprise one or more of a shared social networking group category, a shared calendar event category, a physical-proximity category, a friend-of-a-friend category, and an unconnected category.

A social-networking system 140 and/or a messaging system 150 may maintain groups, such as may be used to organize discussions, news, posts, or other social-networking or messaging information and actions. A particular connection category may be a shared group category, such as a shared social-networking group category. A shared group category may be used to categorize the frequency with which the recipient user replies to messages from users with which they share a group and to categorize the frequency with which the sending user is successful in prompting replies from users with which they share a group. For example, two users may both belong to a social-networking group dedicated to hobbyist stained glass creation, the social-networking group including group conversation, group posts, group sharing, and generally social interaction between members of the group.

A social-networking group being shared may increase the probability that a recipient user would be interested in a message from the sending user. A social-networking group being shared may indicate a possibility that a message sent between members of the group relates to that group and is therefore of interest to the recipient user. In some embodiments, the shared social-networking group connection category may be used independent of any indication of whether the shared social-networking group is responsible for the message being sent. In other embodiments, the shared social-networking group category may be particularly used or may be increased in prominence based on one or more indications that the shared social-networking group is responsible for the message being sent: the message composition interface being instantiated from a view of the shared social-networking group, the recipient user account being discovered in relation to it being listed as a member of the shared social-networking group, or any other indication that the shared social-networking group is responsible for the message being sent or the recipient user being discovered by the sending user.

A message sent between members of the group may increase the predicted interest of the recipient user due to the shared social-networking group representing a commonality of interest between the sending user and the recipient user. For example, a sending user belonging to a social-networking group dedicated to hobbyist stained glass creation may notice that the recipient user has joined the hobbyist stained glass creation group and has been asking questions about good starting equipment for hobbyist stained glass creation. The sending user may message the recipient user, for example, an offer to sell their own starting equipment, having recently purchased new equipment. The sending user and recipient user belonging to the same group may therefore correspond to the two users being more likely to have a relevant topic of conversation about which to message.

Joining a group may comprise an explicit action on the part of a user with a social-networking system 140, in which the user selects the group with the social-networking system 140 and requests to join the group. In some cases, a user joining a group may be withheld until a group administrator for the group approves the user joining the group. A social-networking group may, in some embodiments, be distinguished from a messaging group, where a social-networking group comprises a collection of related social-networking activities while a messaging group directly corresponds to the broadcast of messages between a group of users.

In some embodiments, groups may be divided into various types, with a connection category of the one or more connection categories comprising a shared type-specific-group category, used where the sending user account and recipient user account are both members of a group within that particular type of group. Groups may be assigned to types according to various criteria, such as subject matter, dominant use (commerce or social, etc.), or any other criteria.

A social-networking system 140 and/or a messaging system 150 may maintain calendars, such as may be used to organize events and other scheduling information for its users. A particular connection category may be a shared calendar event category, such as a shared social-networking calendar event category. Two users may both be registered as having an association with a particular calendar event, such as a social event registered with the social-networking system 140. An association with a particular calendar event may correspond to a particular one or any of being invited to the event, having registered oneself as going to attend the event, and/or being registered as having attended the event.

A social-networking system 140 and/or a messaging system 150 may register the locations of user, such as by registering the location of associated client devices. A particular connection category may be a physical-proximity category. In some embodiments, a physical-proximity category may be a shared current physical-proximity category indicating that at the time of message composition, transmission, and/or receipt that the users are in a proximate physical area of each other, such as by being within a predefined distance of each other. In some embodiments, a physical-proximity category may be a shared recent physical-proximity category indicating that within a predefined recency (i.e., quantity of time) of the time of message composition, transmission, and/or receipt that the users were in a proximate physical area of each other. In some embodiments, both a shared current physical-proximity category and a shared recent physical-proximity category may be used.

A friend-of-a-friend category may correspond to two users having one or more shared friends in a social-networking system 140. A friend-of-a-friend-of-a-friend category may correspond to users that each have a friend who are friends with each other in the social-networking system 140. In general, any social-networking relationship known to a social-networking system 140 may be used to defined a connection category.

A reply probability prediction may also include the possibility that the user account or that the message may be unprompted by any connection other than shared use of the messaging system 150 and/or the social-networking system 140. An unconnected category may be used as a default category to represent such cases and to provide for at least one connection category in all cases between all pairs of users of the messaging system 150. An unconnected category may be used to categorize the overall frequency with which the recipient user replies to other users of the messaging system 150 and to categorize the overall frequency with which the sending user is successful in prompting replies from other users of the messaging system 150.

Determining the one or more connection categories between the sender account and the recipient account may comprise accessing an account information repository for the social-networking system 150. An account information repository may store records reflecting information about the sender account and the recipient account with the social-networking system 150. The destination mailbox configuration component 450 may perform one or more information retrievals with the account information repository to determine the one or more connection categories.

In one embodiment, the destination mailbox configuration component 450 may perform an information retrieval for each of the connection categories with which it is configured to consider to determine whether a connection belonging to each connection category is present, with the present connection categories comprising the determined one or more connection categories. In another embodiment, the destination mailbox configuration component 450 may perform an account information retrieval for each of the sender user account and recipient user account to retrieve account information for each. The account information may include a listing of various memberships, registrations, and other associations that indicate, without limitation, the groups, events, locations, and other information associated with the accounts. Determining the one or more connection categories between the sender account and the recipient account may comprise performing a comparison of the sender account information and the recipient account information to determine associations between the accounts. In some embodiments, some connections may be determined using specific correspondence techniques, such as submitting the user accounts to a proximate-location detection system for the social-networking system 150 to determine whether the location histories for the user accounts indicates a shared proximate location for the users.

The destination mailbox configuration component 450 may be operative to determine a predicted reply rate for the incoming unknown contact message 425 based on the one or more connection categories, a recipient reply history for the recipient account, and a sender reply history for the sender account. The recipient reply history may be used to evaluate the tendency of the recipient user to respond to messages from users with which they do not have an established messaging relationship, particularly that tendency in relation to the one or more connection categories. The sender reply history may be used to evaluate the tendency of the sending user to prompt a reply to messages from users with which they do not have an established messaging relationship, particularly that tendency in relation to the one or more connection categories.

The destination mailbox configuration component 450 may determine one or more category-specific predicted reply rates, wherein each of the one or more category-specific predicated reply rates is associated with one of the one or more connection categories. Each of the one or more category-specific predicted reply rates may be a combination of a recipient historic reply rate for a connection category and a sender historic reply rate for the connection category. The destination mailbox configuration component 450 may determine the predicted reply rate based on the one or more category-specific predicted reply rates.

In some embodiments, the recipient history reply rate for a connection category may be the fraction of messages received from another user with which the recipient user does not have a preexisting messaging relationship to which the recipient user replies. In some embodiments, the sender history reply rate for a connection category may be the fraction of messages sent to another user with which the sending user does not have a preexisting messaging relationship from which the sending user receives a reply. Alternatively, the history reply rate may be adjusted to preference (e.g., weight higher) recent messaging interactions as compared to less-recent messaging interactions.

Determining a history reply rate may comprise analyzing a reply history to determine, for each unknown contact message in the reply history, whether a reply was generated: whether each unknown contact message sent by the sender was replied to and whether each unknown contact message received by the recipient was replied to. A running reply rate may be kept, and may be kept for each connection category, which is updated according to each unknown contact message. Upon reception of an unknown contact message, an unknown contact message counter for each of the sender user account and recipient user account may be incremented for each connection category. Upon a reply being sent for an unknown contact message, an unknown contact message reply counter for each of the sender user account and recipient user account may be incremented for each connection category. The historic reply rate for a connection category may thereafter be calculated by dividing the unknown contact message reply counter by the unknown contact message counter for that connection category, wherein distinct counters are kept for sent messages and received messages in order to distinguish between a user's predilection to reply and success in garnering replies, such that each connection category for each user account is associated with four counters: an unknown contact message recipient counter, an unknown contact message sent counter, a sent unknown contact message reply counter, and a received unknown contact message reply counter.

Determining the predicted reply rate based on the one or more category-specific predicted reply rates may comprise averaging the one or more category-specific predicted reply rates by summing the one or more category-specific predicted reply rates and dividing by the number of category-specific predicted reply rates. Alternatively, determining the predicted reply rate based on the one or more category-specific predicted reply rates may comprise selecting the highest predicted reply rate of the determined one or more category-specific predicted reply rates. Alternatively, in some embodiments, the one or more category-specific predicted reply rates may be unequally combined, such as by performing a weighted average. In these embodiments, specific connection categories may be weighted by the delivery mailbox configuration system 100, with the predicted reply rate comprising a weighted average of the one or more category-specific predicted reply rates according to the weights for the one or more connection categories.

The destination mailbox configuration component 450 may be operative to configure the delivery mailbox for the incoming unknown contact message 425 based on the predicted reply rate. The destination mailbox configuration component 450 may configure the delivery mailbox for the incoming unknown contact message 425 as a primary mailbox where the predicted reply rate meets a predefined threshold. The destination mailbox configuration component 450 may configure the delivery mailbox for the incoming unknown contact message 425 as a request-to-chat mailbox where the predicted reply rate falls below the predefined threshold. The destination mailbox configuration component 450 may configure the delivery mailbox based on a comparison of the predicted reply rate and the predefined threshold. In some embodiments, different thresholds may be used for different connection categories.

Determining the one or more connection categories, determining the predicted reply rate, and configuring the delivery mailbox for the incoming unknown contact message 425 based on the predicted reply rate may be performed in response to determining that the incoming unknown contact message 425 is a first message sent from the sender account to the recipient account. Similarly, or additionally, determining the one or more connection categories, determining the predicted reply rate, and configuring the delivery mailbox for the incoming unknown contact message 425 based on the predicted reply rate are in response to determining that the sender account is not on a friends list for the recipient account and is not on a contacts list for the recipient account. In general, determining the one or more connection categories, determining the predicted reply rate, configuring the delivery mailbox for the incoming unknown contact message 425 based on the predicted reply rate, and configuring the incoming unknown contact message 425 with the banner message 455 indicating the most-prominent connection category may be performed in response to determining that no existing messaging relationship exists between the sender user account and the recipient user account. Where a previous unknown contact message was sent from the sender account to the recipient account, without a response, an additional incoming unknown contact message 425 may be automatically discarded.

The messaging interface component 440 may be operative to transmit a message notification to the recipient client device 120 in association with the incoming unknown contact message 425 in response to the predicted reply rate meeting the predefined threshold. The messaging interface component 440 may transmit a push notification to a push notification server associated with the recipient client device 120, with such association depending on one or more of a device provider for the recipient client device 120, a device operating system provider for the recipient client device 120, a cellular data provider for the recipient client device 120, or according to any other association as to determine a push notification server for the recipient client device 120. The messaging interface component 440 may initiate the network transaction to transmit a push notification based on the determination of the delivery mailbox to which to deliver the incoming unknown contact message 425. The messaging interface component 440 may determine whether to perform a push notification network transaction based on determination of the delivery mailbox, and as such the messaging interface component 440 determining the delivery mailbox may configure the network activity of messaging interface component 440 for the delivery of the incoming unknown contact message 425. Alternatively, in some embodiments, only messages from users with which the messaged user has an existing messaging relationship may generate a notification, with no unknown-contact messages generating a notification.

The destination mailbox configuration component 450 may include a banner message 455 with some or all messages transmitted to client devices. A banner message 455 may encapsulate various information to aid the recipient user in identifying the sending user. In some embodiments, a banner message 455 may be sent with all initial messages between users—all messages which represent a first messaging exchange between two users. In some embodiments, the banner message 455 may be configured to display the most-prominent connection category, which may correspond to the highest-rated connection category: the connection category with the highest category-specific predicted reply rate. The destination mailbox configuration component 450 may identify a most-prominent connection category of the one or more connection categories and configure the incoming unknown contact message 425 with a banner message 455 indicating the most-prominent connection category.

In some embodiments, a recipient user declining a request-to-chat message from a sending user may act as a rejection of messaging with that sending user and may mark that sender user account with the recipient user account as being blocked. The messaging system 150 may refrain from transmitting additional messages from the blocked sender user account sent to the blocking recipient user account. In other embodiments, the messaging system 150 may reevaluate recipient user accounts once the context between the recipient user account and sender user account. Various actions, such as joining a shared group, being associated with a shared event, or other explicit social-networking actions that imply a connection between the sending user and recipient user may remove a sender user account block to empower the sender user account to again request-to-chat with the recipient user account.

In some cases, a sender user account may be a business account associated with a business entity. A connection category associated with a business account may be an unconnected business connection category. An unconnected business category may be used to categorize the overall frequency with which the recipient user replies to business accounts with the messaging system 150 and to categorize the overall frequency with which the business entity is successful in prompting replies from other users of the messaging system 150. In some embodiments, additional business-specific connection categories may be used, such as previous-purchase business category used for businesses from which the recipient user has made a purchase known to the messaging system 150 and/or the social-networking system 140, a local-business category user for business that are local to the user's current location or home location, or according to any other categorization. It will be appreciated that business accounts may also be associated with connection categories that are not specific to business accounts. Where a banner message 455 is used, the banner message 455 may include an indication as to whether the business account is verified as being associated with a business entity and, if so, what business entity the business account is associated with. Where multiple business connection categories are used, the banner message 455 may communicate which of the multiple business connection categories is a most-prominent connection category between the business and the messaged user.

Where a request-to-chat message comprises a group chat message—a message that would include the recipient user in a group messaging conversation—the sender user account analyzed to determine the delivery mailbox configuration may be the user account of the user inviting the recipient user to the group messaging conversation. A banner message 455, if any, may indicate information about this inviting user. A banner message 455 may also include information about prominent members of the group chat, such as the most active users. A banner message 445 may include a most-prominent connection category for the inviting user. A banner message 455 may alternatively or additionally include a most-prominent connection category for each of one or more most-active users in the group chat.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
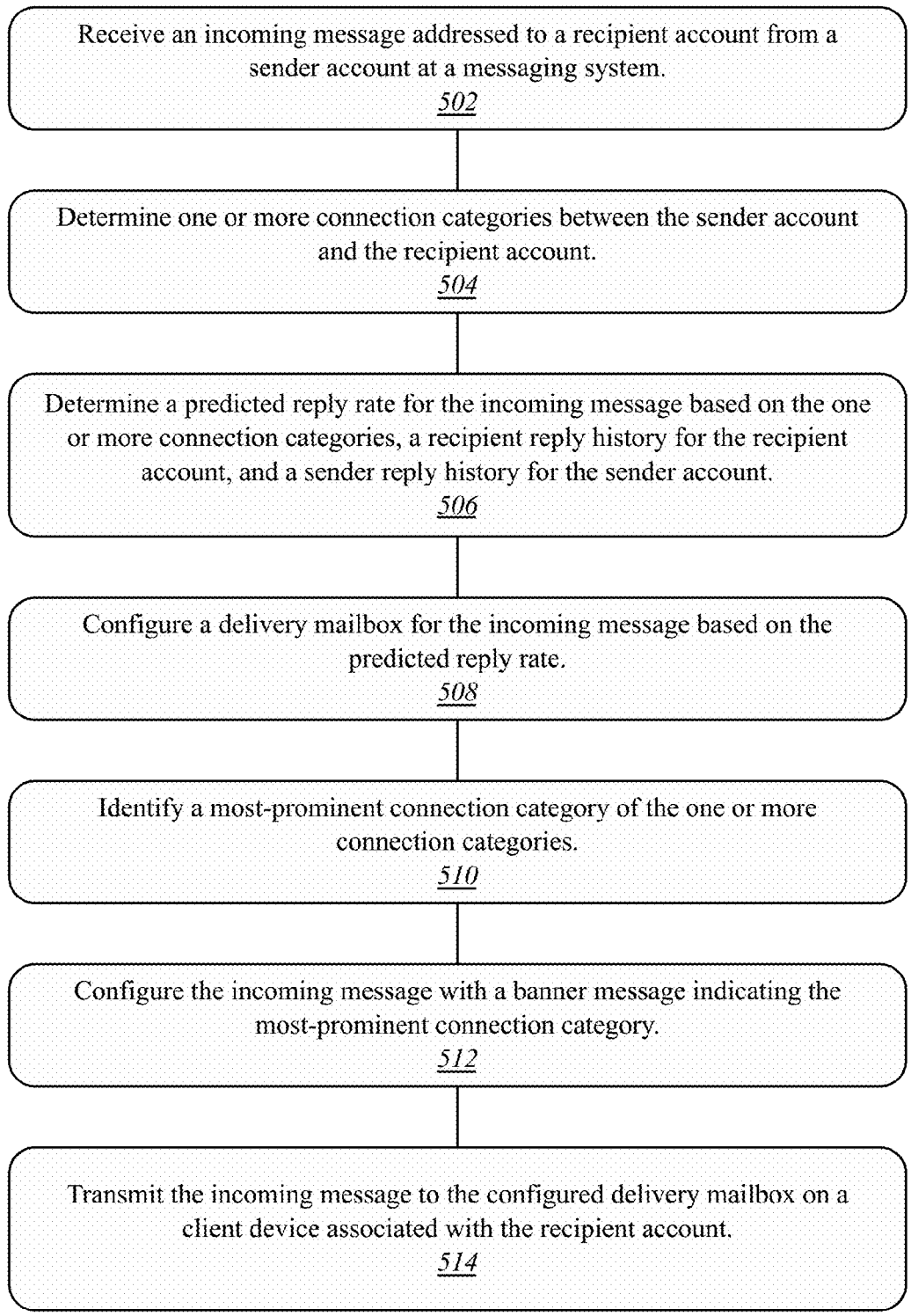
FIG. 5 illustrates an embodiment of a logic flow for the system of FIG. 1.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may receive an incoming message addressed to a recipient account from a sender account at a messaging system at block 502.

The logic flow 500 may determine one or more connection categories between the sender account and the recipient account at block 504.

The logic flow 500 may determine a predicted reply rate for the incoming message based on the one or more connection categories, a recipient reply history for the recipient account, and a sender reply history for the sender account at block 506.

The logic flow 500 may configure a delivery mailbox for the incoming message based on the predicted reply rate at block 508.

The logic flow 500 may identify a most-prominent connection category of the one or more connection categories at block 510.

The logic flow 500 may configure the incoming message with a banner message indicating the most-prominent connection category at block 512.

The logic flow 500 may transmit the incoming message to the configured delivery mailbox on a client device associated with the recipient account at block 514.

The embodiments are not limited to this example.

Figure 6:
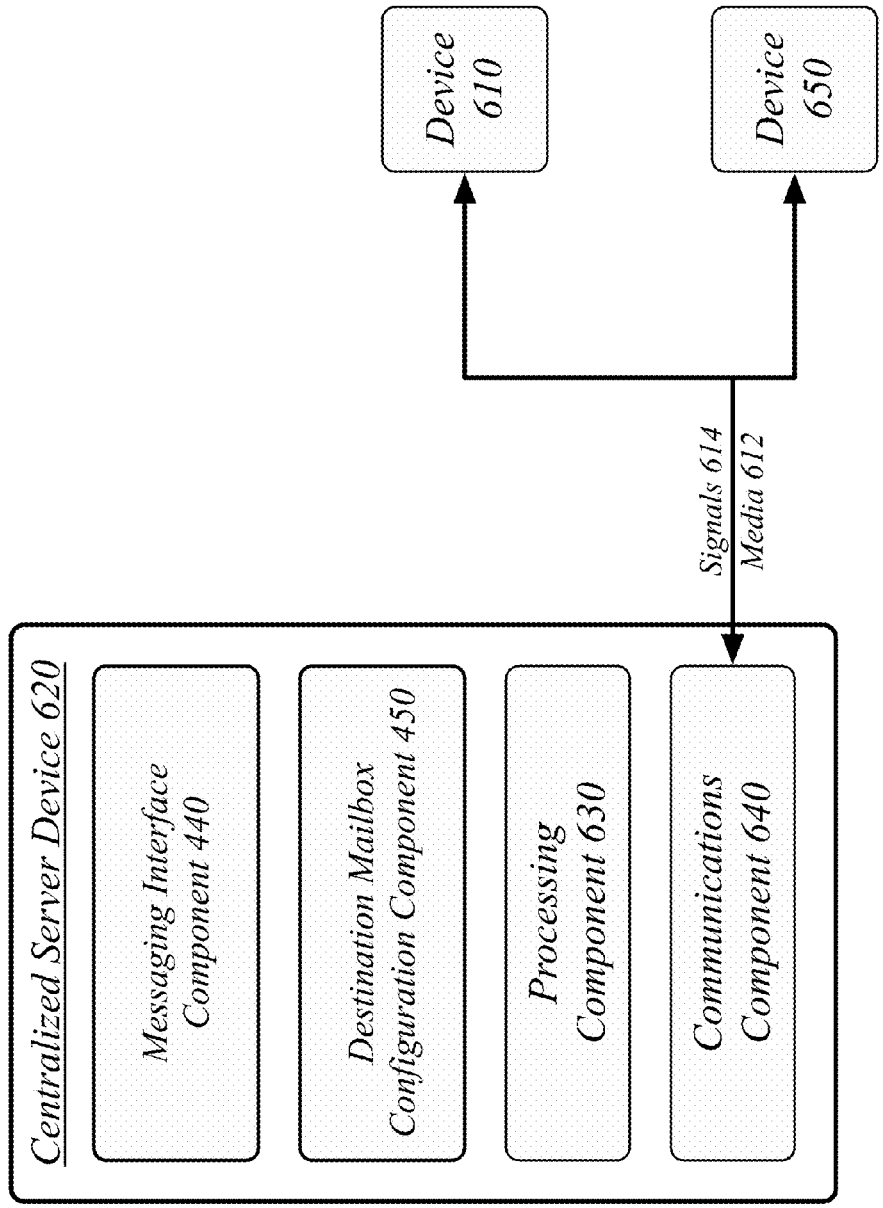
FIG. 6 illustrates an embodiment of a centralized system for the system of FIG. 1.

FIG. 6 illustrates a block diagram of a centralized system 600. The centralized system 600 may implement some or all of the structure and/or operations for the delivery mailbox configuration system 100 in a single computing entity, such as entirely within a single centralized server device 620.

The centralized server device 620 may comprise any electronic device capable of receiving, processing, and sending information for the delivery mailbox configuration system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 620 may execute processing operations or logic for the delivery mailbox configuration system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 620 may execute communications operations or logic for the delivery mailbox configuration system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 620 may communicate with other devices 610, 650 over a communications media 612 using communications signals 614 via the communications component 640. The devices 610, 650 may be internal or external to the centralized server device 620 as desired for a given implementation. In some embodiments, devices 610, 650 may correspond to client devices, such as recipient client device 120, known contact client device 160, predicted interest client device 170, predicted non-interest client device 180, and sender client device 220.

Figure 7:
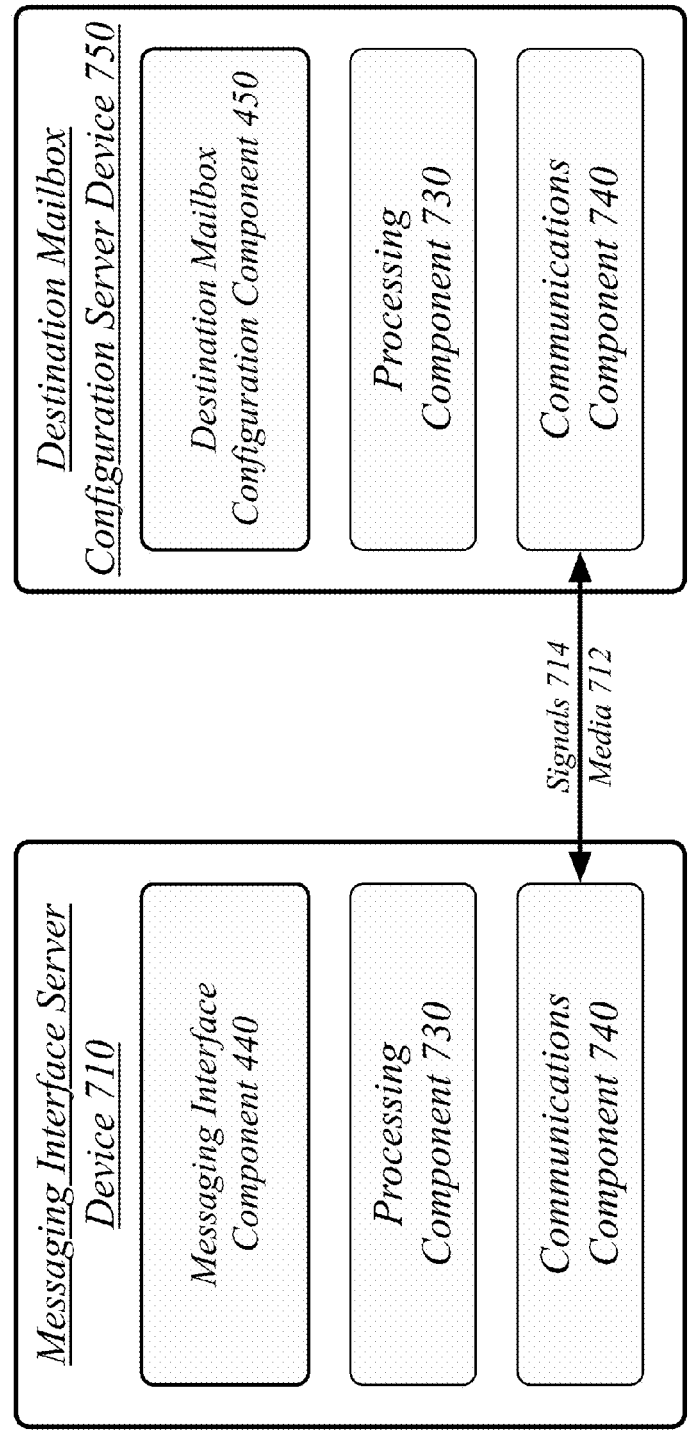
FIG. 7 illustrates an embodiment of a distributed system for the system of FIG. 1.

FIG. 7 illustrates a block diagram of a distributed system 700. The distributed system 700 may distribute portions of the structure and/or operations for the delivery mailbox configuration system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a messaging interface server device 710 and a destination mailbox configuration server device 710. In general, the server devices 710, 750 may be the same or similar to the centralized server device 620 as described with reference to FIG. 6. For instance, the server devices 710, 750 may each comprise a processing component 730 and a communications component 740 which are the same or similar to the processing component 630 and the communications component 640, respectively, as described with reference to FIG. 6. In another example, the server devices 710, 750 may communicate over a communications media 712 using communications signals 714 via the communications components 740.

The messaging interface server device 710 may comprise or employ one or more client programs that operate to perform various methodologies in accordance with the described embodiments. In one embodiment, for example, the messaging interface server device 710 may implement the messaging interface component 440. It will be appreciated that in some embodiments a plurality of messaging interface server devices may be used, with each one executing a messaging interface component 440.

The destination mailbox configuration server device 710 may comprise or employ one or more server programs that operate to perform various methodologies in accordance with the described embodiments. In one embodiment, for example, the destination mailbox configuration server device 710 may implement the destination mailbox configuration component 450. It will be appreciated that in some embodiments a plurality of destination mailbox configuration server devices may be used, with each one executing a destination mailbox configuration component 450.

Figure 8:
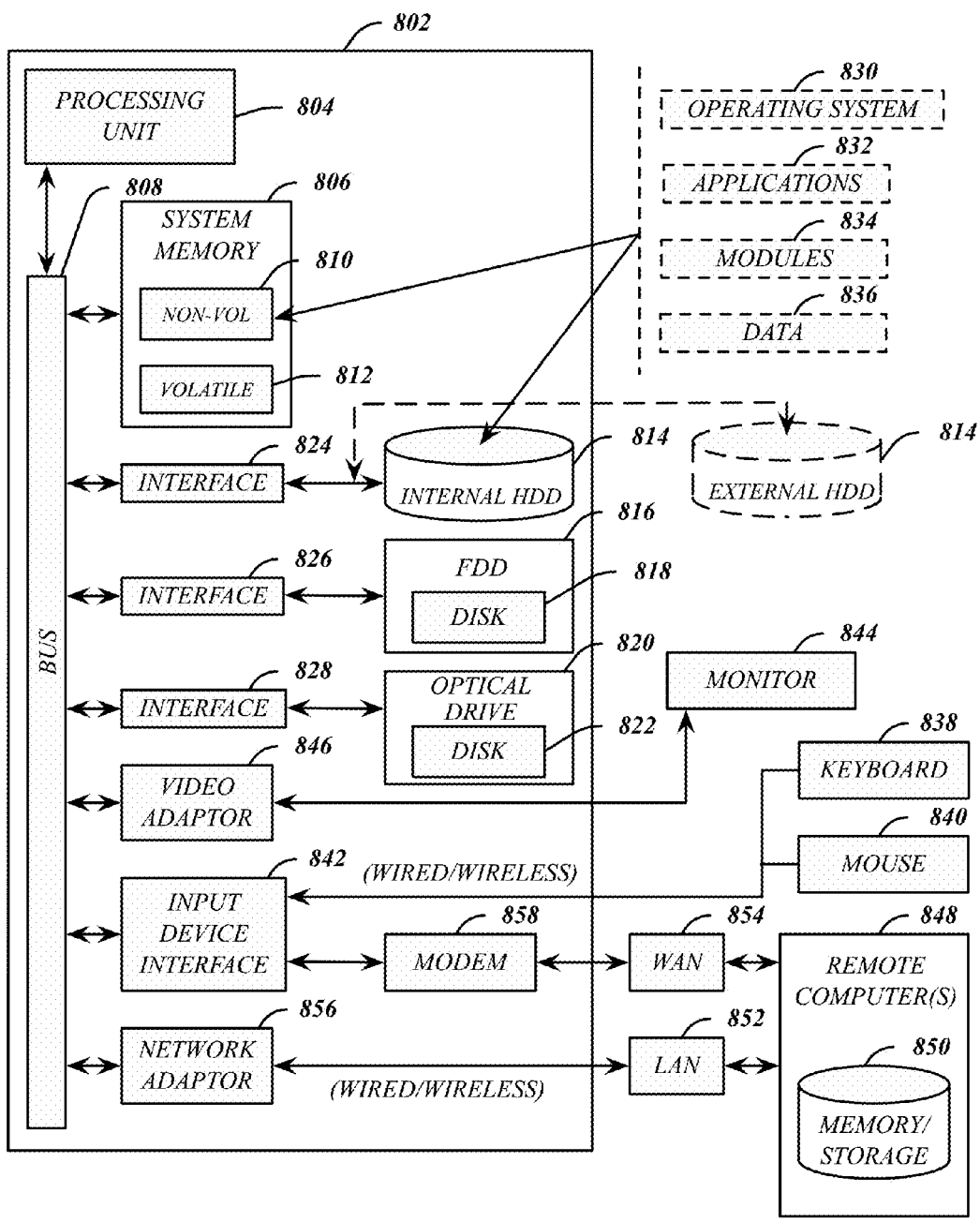
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 6 and FIG. 7, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the delivery mailbox configuration system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.8 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.8x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
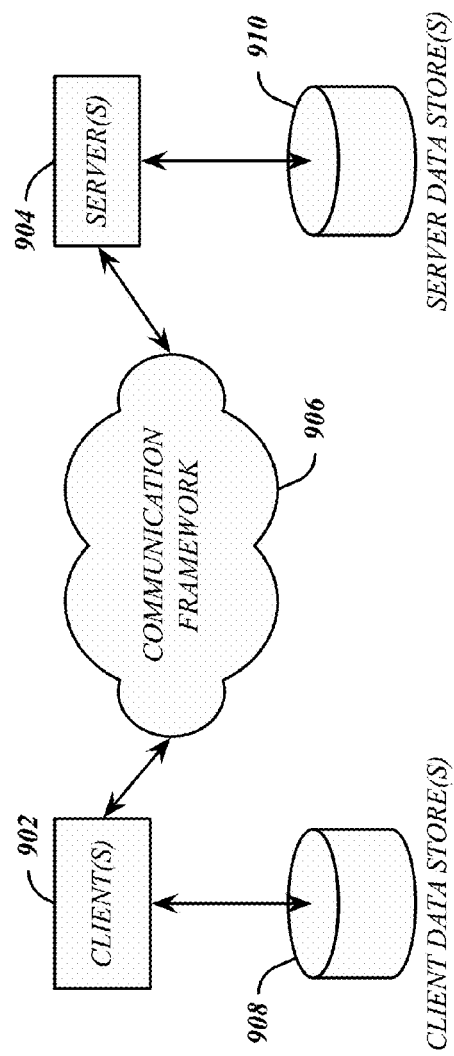
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the recipient client device 120, known contact client device 160, predicted interest client device 170, predicted non-interest client device 180, and sender client device 220. The servers 904 may implement the centralized server device 620, the messaging interface server device 710, and/or the destination mailbox configuration server device 750. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
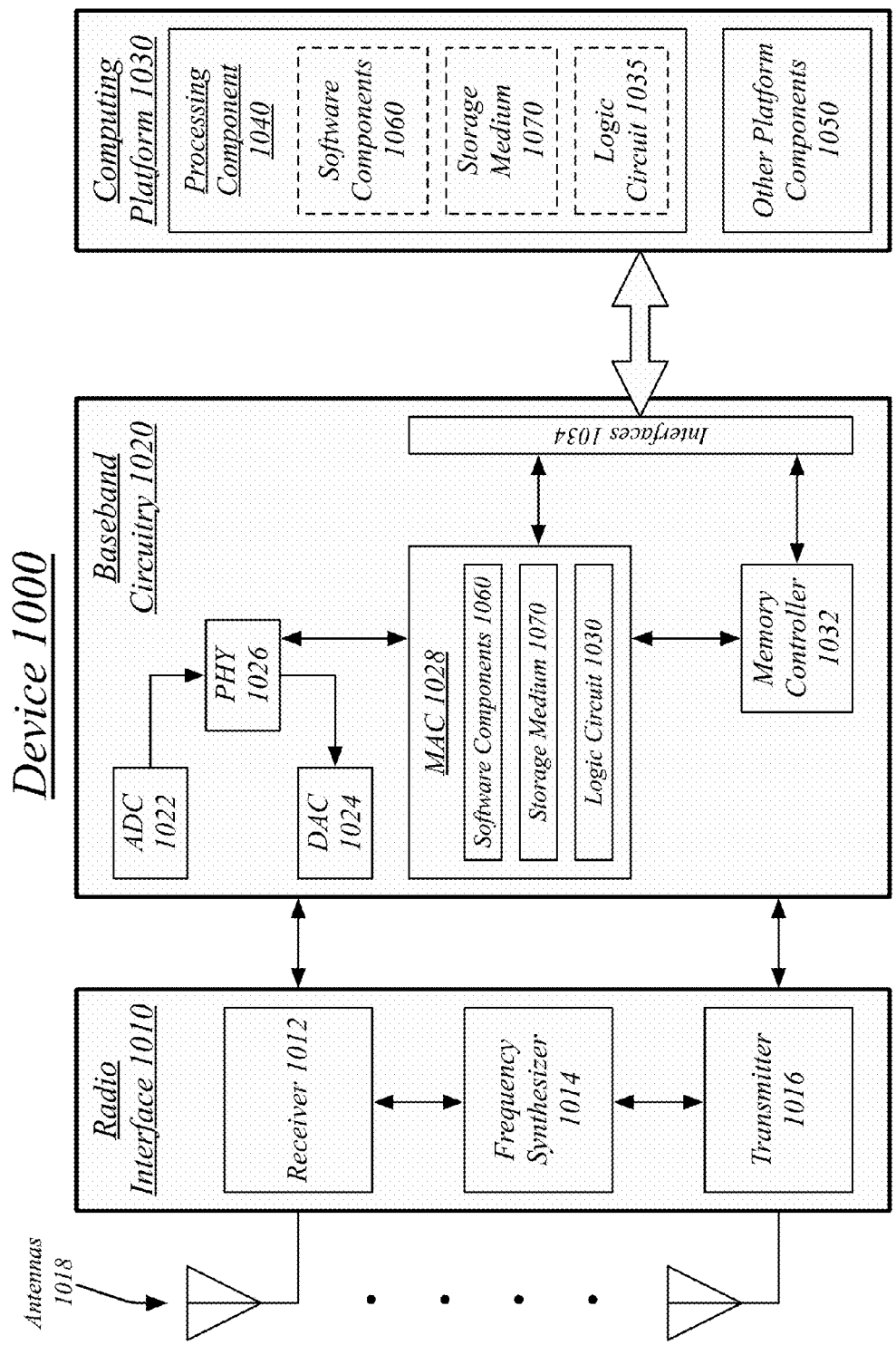
FIG. 10 illustrates an embodiment of a radio device architecture.

FIG. 10 illustrates an embodiment of a device 1000 for use in a multicarrier OFDM system, such as the delivery mailbox configuration system 100. Device 1000 may implement, for example, software components 1060 as described with reference to delivery mailbox configuration system 100 and/or a logic circuit 1035. The logic circuit 1035 may include physical circuits to perform operations described for the delivery mailbox configuration system 100. As shown in FIG. 10, device 1000 may include a radio interface 1010, baseband circuitry 1020, and computing platform 1030, although embodiments are not limited to this configuration.

The device 1000 may implement some or all of the structure and/or operations for the delivery mailbox configuration system 100 and/or logic circuit 1035 in a single computing entity, such as entirely within a single device. Alternatively, the device 1000 may distribute portions of the structure and/or operations for the delivery mailbox configuration system 100 and/or logic circuit 1035 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1056 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames, such as radio frames. Alternatively or in addition, MAC processing circuit 1028 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for the delivery mailbox configuration system 100 and logic circuit 1035 using the processing component 1040. The processing component 1040 (and/or PHY 1026 and/or MAC 1028) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated one or more of the 3GPP LTE Specifications and/or IEEE 1002.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving an incoming message addressed to a recipient account from a sender account at a messaging system; determining one or more connection categories between the sender account and the recipient account; determining a predicted reply rate for the incoming message based on the one or more connection categories, a recipient reply history for the recipient account, and a sender reply history for the sender account; and configuring a delivery mailbox for the incoming message based on the predicted reply rate; and transmitting the incoming message to the configured delivery mailbox on a client device associated with the recipient account.

A computer-implemented method may further comprise identifying a most-prominent connection category of the one or more connection categories; and configuring the incoming message with a banner message indicating the most-prominent connection category.

A computer-implemented method may further comprise wherein determining the one or more connection categories, determining the predicted reply rate, configuring the delivery mailbox for the incoming message based on the predicted reply rate, and configuring the incoming message with the banner message indicating the most-prominent connection category are in response to determining that the incoming message is a first message sent from the recipient account to the sender account.

A computer-implemented method may further comprise wherein determining the one or more connection categories, determining the predicted reply rate, and configuring the delivery mailbox for the incoming message based on the predicted reply rate are in response to determining that the sender account is not on a friends list for the sender account and is not on a contacts list for the sender account.

A computer-implemented method may further comprise the one or more connection categories comprising one or more of a shared social networking group category, a shared calendar event category, a physical-proximity category, and an unconnected category.

A computer-implemented method may further comprise determining one or more category-specific predicted reply rates, wherein each of the one or more category-specific predicated reply rates is associated with one of the one or more connection categories; and determining the predicted reply rate based on the one or more category-specific predicted reply rates.

A computer-implemented method may further comprise wherein each of the one or more category-specific predicted reply rates is a combination of a recipient historic reply rate for a connection category and a sender historic reply rate for the connection category.

A computer-implemented method may further comprise configuring the delivery mailbox for the incoming message as a primary mailbox where the predicted reply rate meets a predefined threshold; and configuring the delivery mailbox for the incoming message as a request-to-chat mailbox where the predicted reply rate falls below the predefined threshold.

A computer-implemented method may further comprise transmitting a message notification to the client device in association with the incoming message in response to the predicted reply rate meeting a predefined threshold.

An apparatus may comprise a processor circuit on a device; a network interface controller on the device; a messaging interface component operative on the processor circuit to receive an incoming message addressed to a recipient account from a sender account at a messaging system; and transmit the incoming message to a configured delivery mailbox on a client device associated with the recipient account using the network interface controller; and a destination mailbox configuration component operative to determine one or more connection categories between the sender account and the recipient account; determine a predicted reply rate for the incoming message based on the one or more connection categories, a recipient reply history for the recipient account, and a sender reply history for the sender account; and configure the delivery mailbox for the incoming message based on the predicted reply rate. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving an incoming message addressed to a recipient account from a sender account at a messaging system;
   determining one or more connection categories between the sender account and the recipient account;
   determining a predicted reply rate for the incoming message based on the one or more connection categories, a recipient reply history for the recipient account, and a sender reply history for the sender account; and
   choosing a delivery mailbox for the incoming message based on the predicted reply rate;
   identifying a most-prominent connection category of the one or more connection categories;
   configuring the incoming message with a banner message indicating the most-prominent connection category; and
   transmitting the incoming message to the chosen delivery mailbox on a client device associated with the recipient account;
   wherein the recipient reply history is based on the historic reply rate of the recipient for messages received from unknown contacts and wherein the sender reply history is the historic reply rate for receiving replies to messages sent to unknown contacts.

2. The method of claim 1, wherein determining the one or more connection categories, determining the predicted reply rate, configuring the delivery mailbox for the incoming message based on the predicted reply rate, and configuring the incoming message with the banner message indicating the most-prominent connection category are in response to determining that the incoming message is a first message sent from the sender account to the recipient account.

3. The method of claim 1, wherein determining the one or more connection categories, determining the predicted reply rate, and configuring the delivery mailbox for the incoming message based on the predicted reply rate are in response to determining that the sender account is not on a friends list for the recipient account and is not on a contacts list for the recipient account.

4. The method of claim 1, the one or more connection categories comprising one or more of a shared social networking group category, a shared calendar event category, a physical-proximity category, and an unconnected category.

5. The method of claim 1, further comprising:
   determining one or more category-specific predicted reply rates, wherein each of the one or more category-specific predicted reply rates is associated with one of the one or more connection categories; and
   determining the predicted reply rate based on the one or more category-specific predicted reply rates.

6. The method of claim 5, wherein each of the one or more category-specific predicted reply rates is a combination of a recipient historic reply rate for a connection category and a sender historic reply rate for the connection category.

7. The method of claim 1, further comprising:
   configuring the delivery mailbox for the incoming message as a primary mailbox where the predicted reply rate meets a predefined threshold; and
   configuring the delivery mailbox for the incoming message as a request-to-chat mailbox where the predicted reply rate falls below the predefined threshold.

8. The method of claim 1, further comprising:
   transmitting a message notification to the client device in association with the incoming message in response to the predicted reply rate meeting a predefined threshold.

9. An apparatus, comprising:
   a processor circuit on a device;
   a network interface controller on the device;
   a messaging interface component operative on the processor circuit to receive an incoming message addressed to a recipient account from a sender account at a messaging system; and transmit the incoming message to a chosen delivery mailbox on a client device associated with the recipient account using the network interface controller; and a destination mailbox configuration component operative to determine one or more connection categories between the sender account and the recipient account; determine a predicted reply rate for the incoming message based on the one or more connection categories, a recipient reply history for the recipient account, and a sender reply history for the sender account; choose the delivery mailbox for the incoming message based on the predicted reply rate; identify a most-prominent connection category of the one or more connection categories; and configure the incoming message with a banner message indicating the most-prominent connection category;

wherein the recipient reply history is based on the historic reply rate of the recipient for messages received from unknown contacts and wherein the sender reply history is the historic reply rate for receiving replies to messages sent to unknown contacts.

10. The apparatus of claim 9, wherein determining the one or more connection categories, determining the predicted reply rate, configuring the delivery mailbox for the incoming message based on the predicted reply rate, and configuring the incoming message with the banner message indicating the most-prominent connection category are in response to determining that the incoming message is a first message sent from the sender account to the recipient account.

11. The apparatus of claim 9, the one or more connection categories comprising one or more of a shared social networking group category, a shared calendar event category, a physical-proximity category, and an unconnected category.

12. The apparatus of claim 9, further comprising:
the destination mailbox configuration component operative to determine one or more category-specific predicted reply rates, wherein each of the one or more category-specific predicted reply rates is associated with one of the one or more connection categories, wherein each of the one or more category-specific predicted reply rates is a combination of a recipient historic reply rate for a connection category and a sender historic reply rate for the connection category; and determine the predicted reply rate based on the one or more category-specific predicted reply rates.

13. The apparatus of claim 9, further comprising:
the destination mailbox configuration component operative to configure the delivery mailbox for the incoming message as a primary mailbox where the predicted reply rate meets a predefined threshold; and configure the delivery mailbox for the incoming message as a request-to-chat mailbox where the predicted reply rate falls below the predefined threshold.

14. The apparatus of claim 9, further comprising:
the messaging interface component operative to transmit a message notification to the client device in association with the incoming message in response to the predicted reply rate meeting a predefined threshold.

15. At least one non-transitory computer-readable storage medium comprising instructions that, when executed, cause a system to:
receive an incoming message addressed to a recipient account from a sender account at a messaging system;
determine one or more connection categories between the sender account and the recipient account;
determine a predicted reply rate for the incoming message based on the one or more connection categories, a recipient reply history for the recipient account, and a sender reply history for the sender account; and
choose a delivery mailbox for the incoming message based on the predicted reply rate;
identify a most-prominent connection category of the one or more connection categories;
configure the incoming message with a banner message indicating the most-prominent connection category; and
transmit the incoming message to the chosen delivery mailbox on a client device associated with the recipient account;
wherein the recipient reply history is based on the historic reply rate of the recipient for messages received from unknown contacts and wherein the sender reply history is the historic reply rate for receiving replies to messages sent to unknown contacts.

16. The non-transitory computer-readable storage medium of claim 15, wherein determining the one or more connection categories, determining the predicted reply rate, configuring the delivery mailbox for the incoming message based on the predicted reply rate, and configuring the incoming message with the banner message indicating the most-prominent connection category are in response to determining that the incoming message is a first message sent from the sender account to the recipient account.

17. The non-transitory computer-readable storage medium of claim 15, the one or more connection categories comprising one or more of a shared social networking group category, a shared calendar event category, a physical-proximity category, and an unconnected category.

18. The non-transitory computer-readable storage medium of claim 15, comprising further instructions that, when executed, cause a system to:
determine one or more category-specific predicted reply rates, wherein each of the one or more category-specific predicted reply rates is associated with one of the one or more connection categories, wherein each of the one or more category-specific predicted reply rates is a combination of a recipient historic reply rate for a connection category and a sender historic reply rate for the connection category; and
determine the predicted reply rate based on the one or more category-specific predicted reply rates.

19. The non-transitory computer-readable storage medium of claim 15, comprising further instructions that, when executed, cause a system to:
configure the delivery mailbox for the incoming message as a primary mailbox where the predicted reply rate meets a predefined threshold; and
configure the delivery mailbox for the incoming message as a request-to-chat mailbox where the predicted reply rate falls below the predefined threshold.

20. The non-transitory computer-readable storage medium of claim 15, comprising further instructions that, when executed, cause a system to:
transmit a message notification to the client device in association with the incoming message in response to the predicted reply rate meeting a predefined threshold.

* * * * *